United States Patent [19]

Montalvo, Sr.

[11] 4,442,931
[45] Apr. 17, 1984

[54] AIR ACTUATED FORCE INTENSIFYING PISTON AND CYLINDER ASSEMBLY FOR BRAKES AND CLUTCHES

[76] Inventor: Edwin J. Montalvo, Sr., 200 Riverside Industrial Pkwy., Portland, Me. 04103

[21] Appl. No.: 273,908

[22] Filed: Jun. 15, 1981

[51] Int. Cl.³ .................................... F16D 25/063
[52] U.S. Cl. ............................ 192/85 AB; 192/82 P; 192/70; 192/20; 188/72.2; 188/72.6; 92/136
[58] Field of Search .............. 192/85 R, 93 R, 70, 192/20, 85 AB, 82 P, 88 A; 188/72.2, 72.4, 188, 72.6, 368; 92/136, 138; 74/516

[56] References Cited

U.S. PATENT DOCUMENTS

| | | | |
|---|---|---|---|
| 946,123 | 1/1910 | Geisenhoner | 192/93 R X |
| 2,858,805 | 11/1958 | Lincoln et al. | 92/136 X |
| 3,237,738 | 3/1966 | Suppes et al. | 192/70 |
| 3,554,097 | 1/1971 | Karpowicz | 92/136 |
| 3,665,771 | 5/1972 | Blatt | 74/89.12 X |
| 4,154,321 | 5/1979 | Falk | 192/70.24 X |
| 4,175,651 | 11/1979 | Montalvo | 192/85 AB |

Primary Examiner—Rodney H. Bonck
Assistant Examiner—James J. Merek
Attorney, Agent, or Firm—Brooks, Haidt, Haffner & Delahunty

[57] ABSTRACT

A double-acting, floating, frictional coupling mechanism including an air-operated diaphragm-type piston having a piston rod in meshed engagement with a set of different gears. The differential gearing intensifies the force transmitted through the piston rod by the air-operated piston.

6 Claims, 6 Drawing Figures

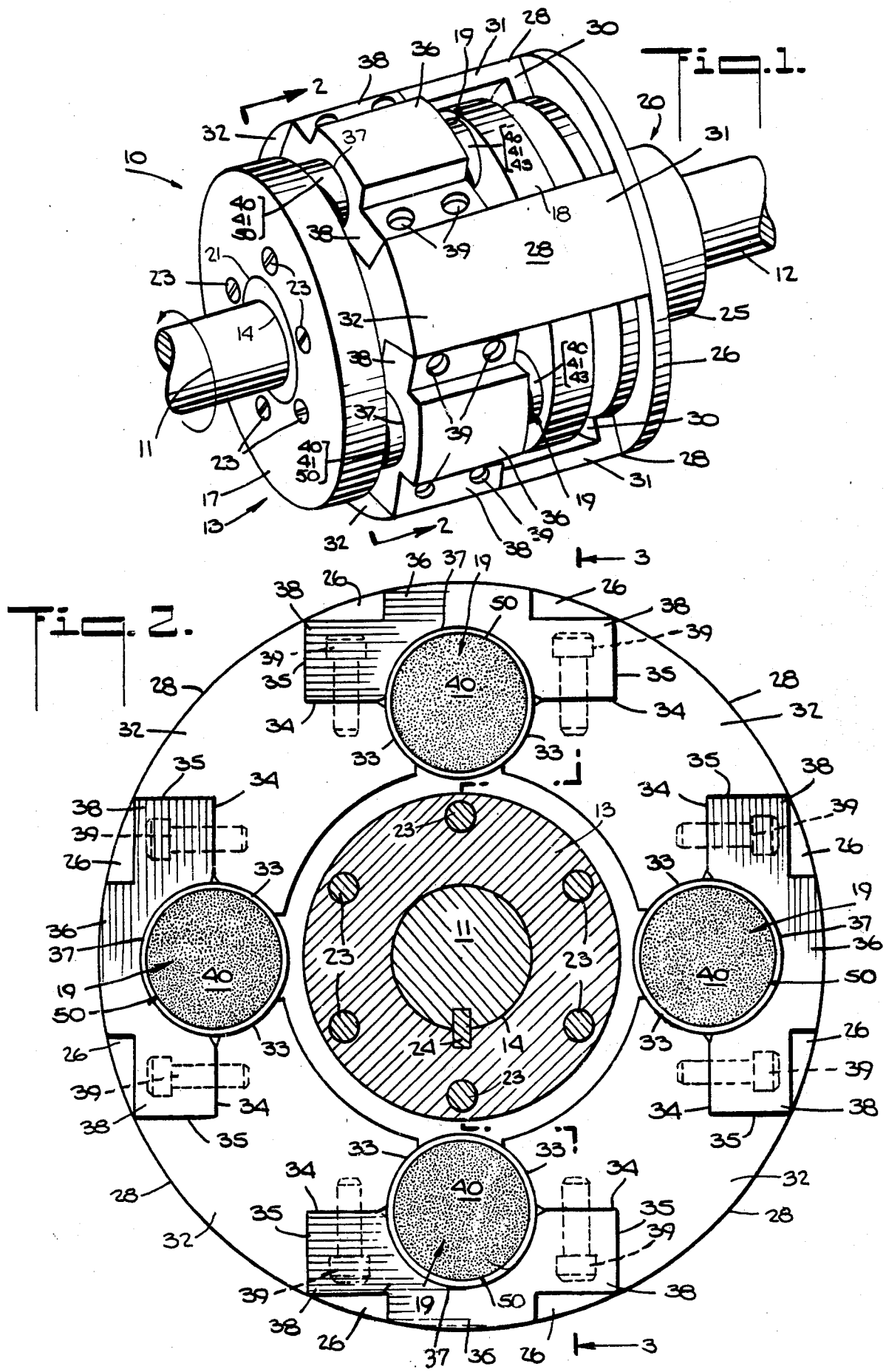

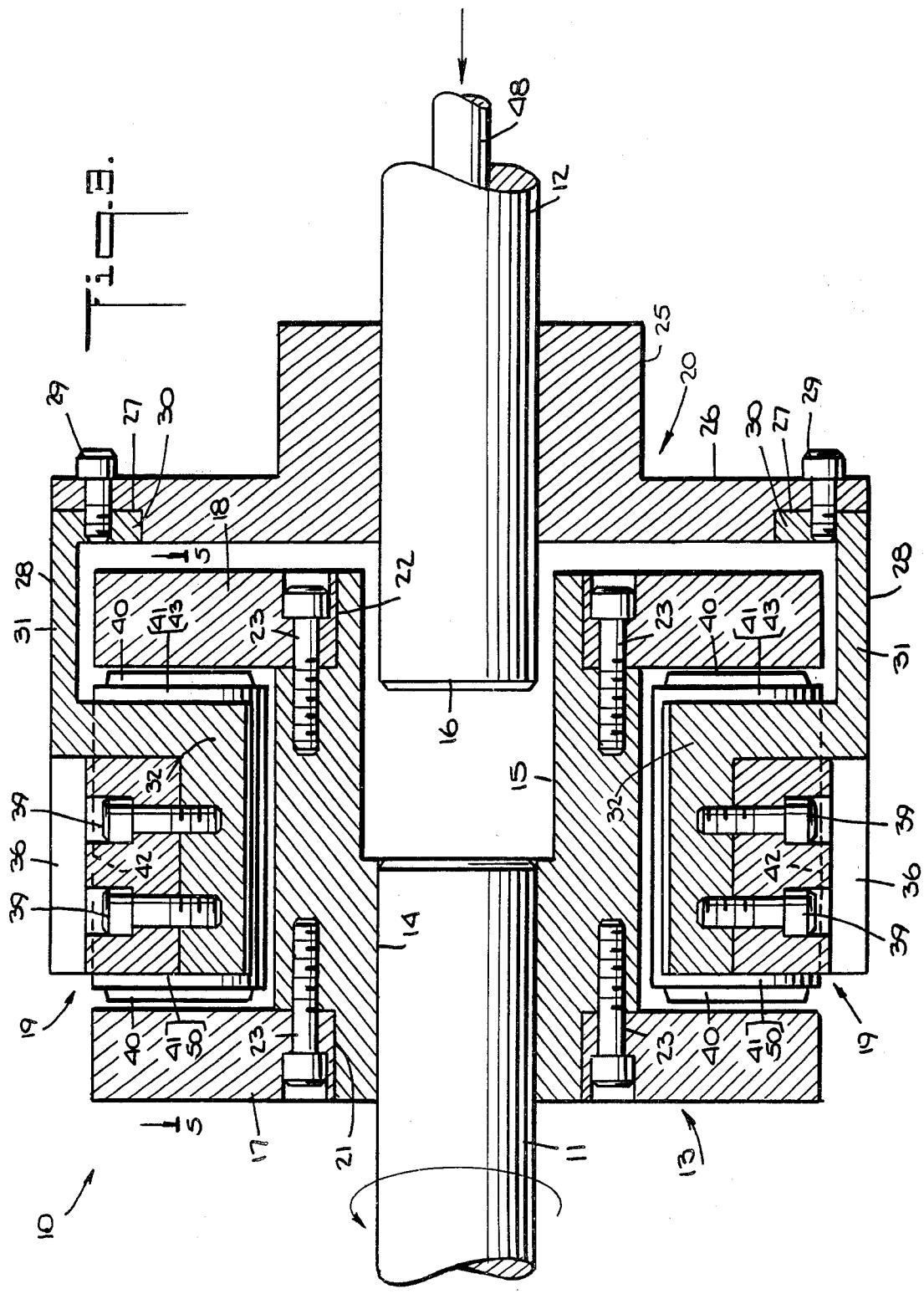

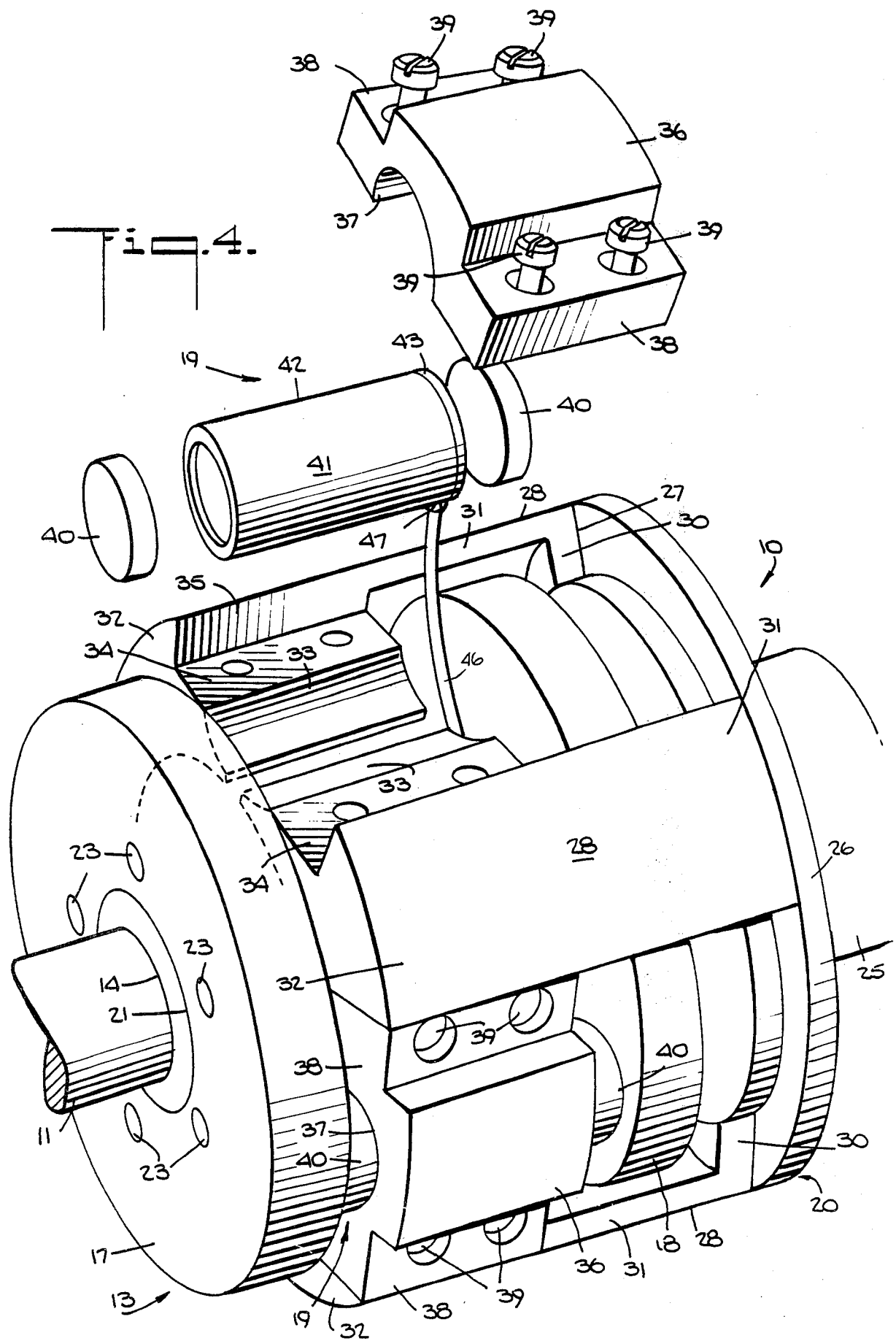

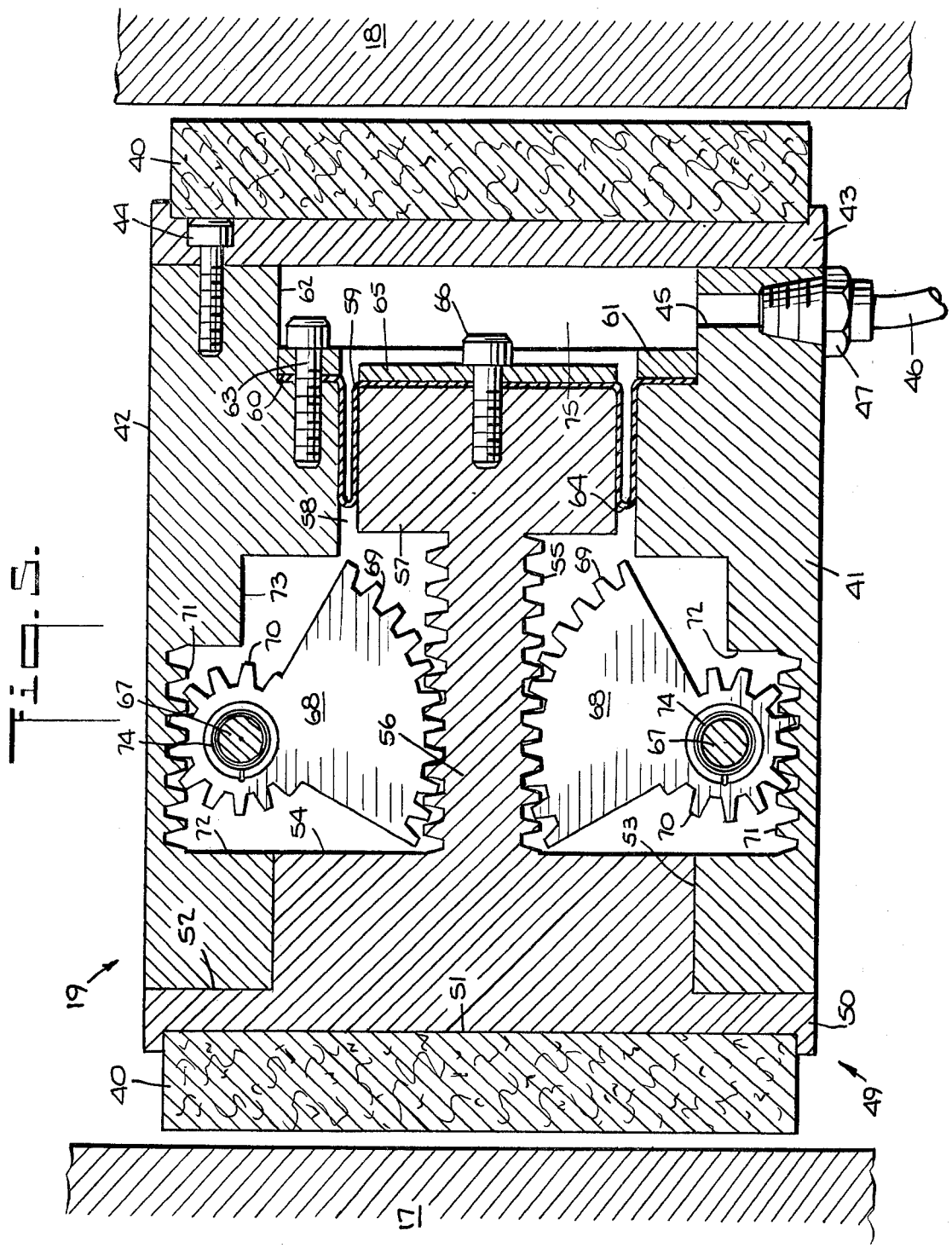

AIR ACTUATED FORCE INTENSIFYING PISTON AND CYLINDER ASSEMBLY FOR BRAKES AND CLUTCHES

BACKGROUND OF THE INVENTION

1. Field of the Invention

The present invention relates to friction coupling mechanisms such as brakes wherein a rotatable element is frictionally coupled to a relatively nonrotatable element and clutches wherein two relatively rotatable elements are coupled and uncoupled. More particularly, the invention relates to friction coupling mechanisms wherein differential gear diameters are used to achieve force multiplication in an air-actuated force intensifying piston and cylinder assembly.

2. Description of the Prior Art

Hydraulic and hydraulic-pneumatic brakes and clutches having friction members driven outwardly in opposite directions to engage opposed discs have been described in Suppes et al, U.S. Pat. Nos. 3,237,738 and 3,311,205 and 3,584,717, as well as in Montalvo, U.S. Pat. Nos. 3,696,900 and 4,175,651. The devices disclosed in those patents are compact and easy to service. The present invention incorporates advantageous features shown in the above identified patents, and more specifically, the present invention represents an improvement upon the piston and cylinder assembly disclosed and claimed in Montalvo U.S. Pat. No. 4,175,651, the disclosure of which is incorporated by reference herein in its entirety.

Force multiplication, as applied to brakes and clutches, is not a new concept. Bauman, U.S. Pat. No. 3,268,038 discloses a vehicular braking mechanism which utilizes differential area pistons in a wheel cylinder wherein applied braking force is intensified for actuation of the vehicle's brake shoes. Montalvo, U.S. Pat. No. 4,175,651 discloses a friction coupling mechanism for use in brakes and clutches where force intensification is achieved by use of a compound piston arrangement, and Falk, U.S. Pat. Nos. 4,089,393 and 4,154,321 disclose a disc brake system where force multiplication is achieved through use of a pair of cams mounted on a movable cam carrier.

With respect to differential gearing, Blatt, U.S. Pat. No. 3,665,771 discloses the use of differential rack and pinion gearing to multiply piston stroke of a fluidized cylinder, thus extending the longitudinal movement of a carriage assembly.

The concept that when a force is directly applied to one of two opposed friction shoes or pads, there is a simultaneous application of an equal reaction force indirectly imposed on the other shoe by reason of a self-aligning piston and cylinder assembly is also not a novel concept as the same has been suggested in Dotto et al, U.S. Pat. No. 3,081,843 and Montalvo, U.S. Pat. No. 4,175,651.

Despite the wide variety of prior art clutches and brakes, there continues to be a real need for improved friction coupling mechanisms that combine compactness with high torque capability, especially for industrial applications where space is limited.

SUMMARY OF THE INVENTION

The friction clutch or brake of this invention incorporates a force multiplying piston and cylinder assembly wherein force multiplication is achieved through use of gear segments having differential gear diameters. This assembly constitutes an improvement upon the piston and cylinder assembly covered by U.S. Pat. No. 4,175,651, which uses dual diameter pistons with mercury or other seepage resistant liquid confined therebetween for the force multiplication effect. There is a substantial advantage in using the piston and cylinder assembly of the present invention because there is no need to be concerned with elaborate sealing techniques and/or with use of liquids having high surface tension properties, since the present assembly does not require use of a hydraulic fluid for its operation.

In a preferred embodiment of the invention there are a plurality of piston-cylinder assemblies arranged to "float" for double-acting axial extension to engage opposed plates which can be considered as discs. Each double-acting piston-cylinder assembly constitutes a separate generally cylindrical module slidingly fitted into one of a plurality of equally arcuately spaced bores of a body for exertion of equal pressure by friction shoes or pads at opposed ends of the module against the discs when the clutch or brake is engaged.

Although a presently preferred embodiment of the invention in the form of a clutch is described in detail, it will be understood that the principles and structure of the invention are contemplated to have wide applicability to other uses where conventional pneumatic or hydraulic-pneumatic devices are now employed as linear actuators.

The piston-cylinder assembly shown has a diaphragm-type internal piston guided for axial movement within the module under pneumatic pressure which in a typical application is supplied by a plant air system. The moving piston, which is double-acting, forces a friction shoe, carried by the outer face of the piston, against the first of two opposed friction discs for frictional engagement therewith. Simultaneously, the moving piston transfers its motion via a set of differential gearing to the cylinder housing, thereby causing the cylinder housing to move in a direction opposite to that of the piston. A second of the two friction shoes, carried by the end of the module, opposite to the outer face of the piston, is then brought into frictional engagement with the second of the two opposed friction discs. In addition to transferring motion to the cylinder housing, the differential gearing also intensifies the force transmitted by the pressurized piston. This intensified force is exerted by the second of the two friction shoes against its respective friction disc. Because the module is permitted to float between the two opposed discs, an equal and opposite force is then exerted by the other friction shoe, carried by the piston, against its respective friction disc. This floating action also adjusts automatically for unequal wearing, if any, of the respective friction shoes.

When, as is preferred in brakes or clutches incorporating the piston and cylinder assembly of the invention, a plurality of modules are employed, each can be individually controlled by control of the air supply, if desired. The mounting arrangement for a brake or clutch is so structured as to facilitate access for inspection, maintenance or replacement of working parts. These and other applications, objects and advantages of the invention will be more fully understood from the following detailed description of a preferred embodiment of the invention, especially when that description is read in conjunction with the accompanying drawing figures illustrating a clutch according to the invention.

BRIEF DESCRIPTION OF THE DRAWINGS

In the accompanying drawings, in which like reference characters indicate like parts throughout:

FIG. 1 is an overall view in perspective of a clutch embodying piston-cylinder modules according to the invention;

FIG. 2 is a section view of the clutch of FIG. 1 taken along line 2—2 of FIG. 1 and looking in the direction of the arrows, with concealed parts indicated by dashed lines;

FIG. 3 is a view in section taken along line 3—3 of FIG. 2;

FIG. 4 is a partially exploded view of the clutch of FIG. 1 showing the manner of assembly of parts for easy service;

FIG. 5 is a detail view in section of a piston-cylinder module with new friction shoes in retracted condition, taken along line 5—5 of FIG. 3.

DETAILED DESCRIPTION OF A PREFERRED EMBODIMENT

Figure 6:
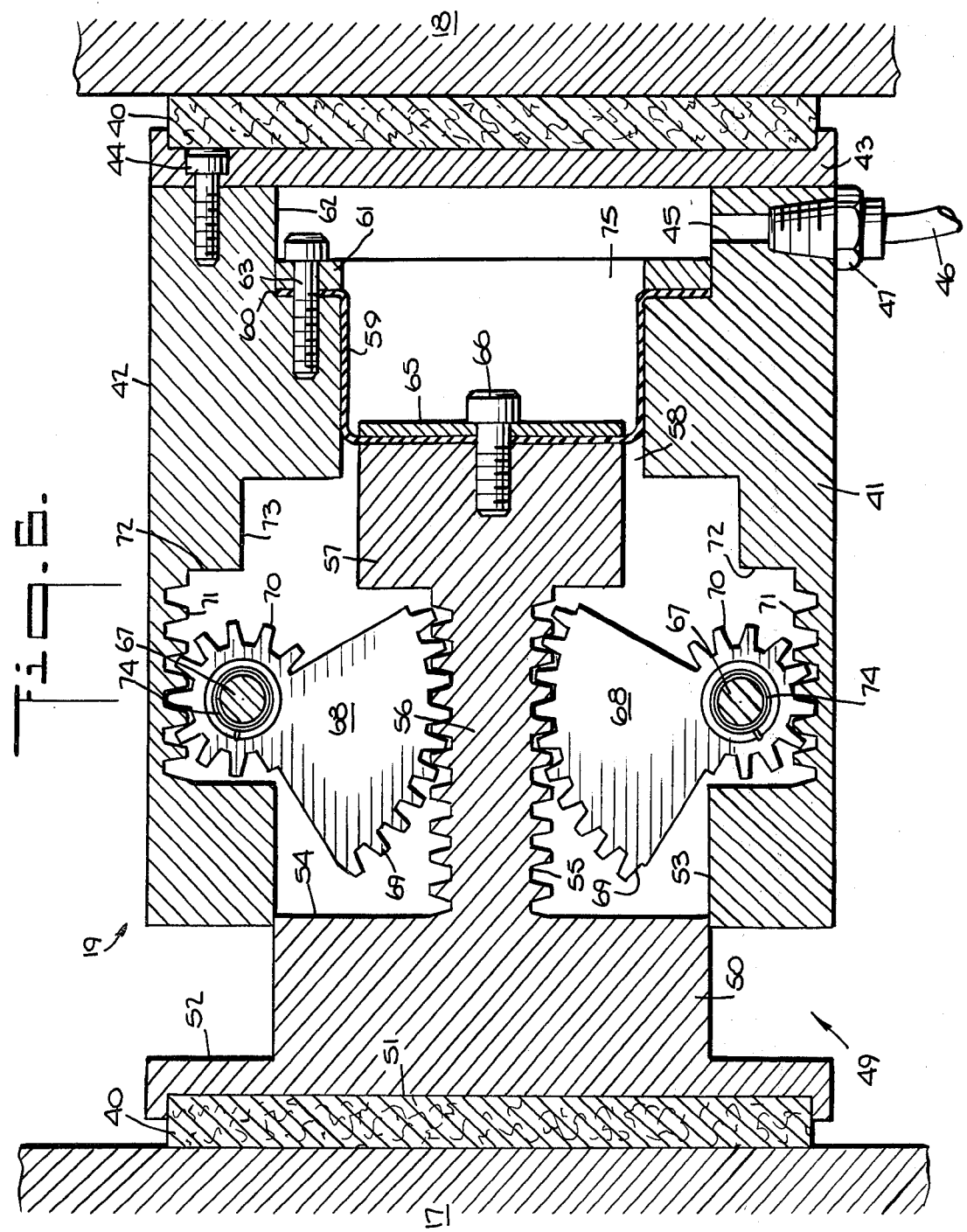
FIG. 6 is a view similar to FIG. 5 but showing the piston-cylinder module with worn friction shoes in extended condition.

The clutch generally designated by reference numeral 10 in the drawing is of the type used for selectively transmitting rotational motion from a driving element, shown as a shaft 11, to a driven element, shown as a shaft 12 which has its axis aligned with the axis of the shaft 11. It will be understood that if the output or driven element were replaced by a fixed element the device shown would function as a brake.

The reference numeral 13 in the drawings generally designates a rotor body affixed to the driving shaft 11 for rotation therewith. As best shown in FIG. 3, the rotor body 13 is generally cylindrical, with a central axial bore at 14 tightly fitted on the shaft 11, which bore widens at 15 to surround the end 16 of the output shaft 12 which is freely rotatable within the axial space at 15 where the rotor body 13 extends beyond the end of the driving shaft 11.

Mounted on the rotor body 13, at opposite ends thereof, are a pair of flat ring-shaped plate members 17 and 18 which extend radially outward. The plate members 17 and 18, which rotate with the drive shaft 11, can be considered as a pair of opposed, parallel discs for engagement by double-acting outwardly extensible piston and cylinder assemblies generally designated 19 mounted between the plates 17 and 18 and arranged parallel to the axes of the shafts 11 and 12. These piston and cylinder assemblies are mounted on a piston carrier 20 secured to the output shaft 12 for rotation therewith. When the piston and cylinder assemblies 19 are in their extended condition, the rotor 13 is coupled to the piston carrier 20 and the output shaft 12 is driven to rotate with the drive shaft 11.

Attention is directed to the preferred manner of assembling the elements just described, as shown in FIG. 3. It will be seen that the rotor body 13 has annular steps 21 and 22 at its opposite ends for reception of the ring-like plates 17 and 18 which are secured to the rotor body 13 by a plurality of screws 23, the heads of which are preferably recessed as shown. The rotor body 13 and radially extending elements 17 and 18 could also be of unitary construction.

FIG. 2 shows that the rotor body 13 is keyed to the shaft 11 by a member 24.

The piston carrier 20 is keyed to the output shaft 12 and comprises an annular collar 25 with a radially extending peripheral flange 26. The flange 26 has an annular step area at 27 facing inwardly, and a plurality of legs 28 mounted at the area 27 are secured to the flange 26 by screws 29 as shown in FIG. 3. The legs 28 extend parallel to the axes of the shafts 11 and 12 for mounting of the piston and cylinder assemblies 19 upon and between adjacent legs 28. In the embodiment illustrated there are four piston and cylinder assemblies 19 and four legs 28 equally arcuately spaced about the shaft axes, but some other number could be provided.

FIGS. 1, 2 and 4 show that the legs 28 have foot portions 30, arcuate in shape and attached to the flange 26, an intermediate portion 31 formed as a segment of a cylinder extending past the plate 18 and leaving clearance for rotation of the plate 18, and a cylinder assembly mounting portion 32 that is shaped somewhat like the letter X in profile when viewed along a line parallel to the axis of rotation of the shaft 11.

The sectional view of FIG. 2 illustrates how the legs 28 receive the piston and cylinder assemblies 19 between arcuately curved areas 33 of the mounting portions 32 of adjacent legs 28, and the partially disassembled view of FIG. 4 can be compared with FIG. 2 to see how the parts 19 and 28 interfit. Radially outward of the curved areas 33, both longitudinal sides of the mounting portion 32 of each leg 28 are formed with a generally rectangular step having a flat base 34 and a flat wall 35, and the opposed stepped areas of adjacent legs 28 constitute a generally rectangular mounting space for demountable cap or cover members 36 which fit over the piston and cylinder assemblies 19. The cap 36, removed in FIG. 4, can be seen to have a curved interior area at 37 for embracing the piston and cylinder assembly 19 and a pair of wings 38 which in assembled condition, overlie the base areas 34 of the leg portions 32 and are secured thereto by pairs of screws 39 which fit into threaded bores of the leg portion 32 to secure the piston and cylinder assemblies 19 in place while permitting easy access to the assemblies 19 for inspection and maintenance, as shown in FIG. 4.

The friction coupling assembly described can, of course, be used with any of various kinds of double acting piston and cylinder assemblies, whether hydraulic, pneumatic or hydraulic-pneumatic, and will provide the advantages of quick servicing of working parts. However, the structure described is particularly advantageous when used in connection with air actuated force intensifying piston and cylinder capsules according to the present invention as shown in detail in FIGS. 5 and 6.

It will be seen from the various drawing figures that the piston and cylinder assembly 19 is mounted as a "floating" capsule, embraced between the curved areas 33 and 37 but not secured thereto, so the entire capsule assembly 19 can move in either direction parallel to the axis of rotation of the shaft 11. The bearing surfaces 33 and 37 and the capsule 19 itself are machined for easy sliding motion. As shown in FIGS. 5 and 6, both ends of the piston and cylinder capsule assembly 19 carry friction shoes or pads 40 for frictional engagement with the plates 17 and 18 when the clutch is engaged. The free floating mounting of the capsule 19 causes the friction shoes 40 to exert equal pressure on both discs 17 and 18.

The capsule assembly 19 has been called double-acting in this description in that both ends carrying the shoes 40 move outward upon actuation and inward upon return. The assembly 19 has a housing 41 with a cylindrical outer wall 42. At one end, the housing 41 is closed by a cover 43 secured to the housing 41 by a plurality of bolts 44, one of which is shown. The cover 43 has a central recess for the friction shoe 40, which can be of an asbestos composition or the like. A passageway 45 is provided through the housing 41 for supplying air to the interior of the housing 41. As shown in FIGS. 4–6, a flexible air hose 46 feeds air under pressure to the capsule 19, and the hose 46 is preferably secured by a threaded fitting 47 at an opening of the passageway 45 at the periphery of the outer wall 42 of the housing 41. Reverting to FIG. 3, it will be seen that the main supply line 48 for bringing air under pressure to all of the piston and cylinder capsule assemblies 19 can be a passage through the shaft 12, ultimately connected to a plant air supply, which may typically provide sixty pounds per square inch gauge pressure.

At the housing end 49, opposite from the cover 43, there is a working piston 50 which carries a friction shoe 40 in a recess in the piston face 51. It will be seen that piston 50 has an annular step area facing inwardly at 52 which is slidably fitted within bore 53 of housing 41. Inwardly located from the annular step area 52, piston 50 has another annular step area at 54, also facing inwardly. The base of the annular step area 54 forms the outer surface 55 of the piston rod 56 which has a cylindrical shaped head 57 that is spaced from the housing 41 by an annular space 58. Piston 50, piston rod 56 and piston head 57 need not be of unitary construction, but may be a combination of elements secured together by threading, welding or the like.

The piston rod head 57 forms an internal piston which is shown as being of the rolling diaphragm type. The diaphragm 59 is mounted at its peripheral area 60 between a flat annular plate member 61 and radially disposed surface of the annular step area at 62 of the housing 41, the diaphragm 59 being secured to the housing 41 by a plurality of screws 63, one of which is shown. In FIG. 5, it will be seen that the diaphragm 59 has a full 180 degree convolution at 64 between the diaphragm edge 60 and its central area overlying the piston rod head 57. The central area of diaphragm 59 is tightly fitted against the piston rod head 57 by a flat plate member 65 which is secured to the piston rod head 57 by a screw 66. During the motion of the piston rod head 57, the diaphragm 59 rolls along the walls defining the annular space 58, as shown by the comparison of FIGS. 5 and 6. A rolling diaphragm, like diaphragm 59, thus provides a relatively long stroke. FIG. 5 shows a released position of the assembly 19, while FIG. 6 shows the assembly 19 extended to its maximum axial position at that point when the friction shoes 40 are worn and must therefore be replaced. The friction shoes 40, when new, are spaced close to the friction plates 17 and 18, as shown in FIG. 5, so that engagement of the clutch 10 requires only a very short stroke.

Using air under relatively low pressure, such as manufacturing plant pressurized air at 60 p.s.i.g. permits easy direction and actuation control through air valves which are generally less expensive than hydraulic valves. Pressure can be regulated through an air pressure regulator valve.

Diametrically opposed within assembly 19 and rotatably secured to the housing 41 by pins 67 are flat members 68, which, when viewed along a line perpendicular to the axis of rotation of the shaft 11, have profiles that appear to be shaped somewhat like a quadrant of a circle that is overlapped by a smaller circle at the vertex of the quadrant equally disposed about the axis of symmetry thereof. The arcuate surfaces 69 and 70 of members 68 have a spur gear tooth configuration which meshes respectively with a corresponding gear tooth configuration formed within surface 55 of the piston rod 56 and also formed within the axial surface 71 of the outwardly extending annular groove 72 formed within the inside wall surface 73 of the housing 41. The gear tooth configuration of the surfaces 55 and 73 of the piston rod 56 and of the housing 41, respectively, could be formed from rectangular bar shaped members, having notched teeth thereon, secured to the piston rod 56 and to the housing 41.

A coiled spring 74 is positioned around each of the pins 67. One end of the spring 74 is secured to the housing 41, and the other end of the spring 74 is secured to the member 68. The springs 74, which are subjected to a torsional loading when the assembly 19 is in engaged position, as shown in FIG. 6, serves as a return spring for the assembly 19 when the air under pressure in the chamber 75 is discharged to disengage the clutch 10.

As will be seen in FIGS. 5 and 6, the pitch circle radius of the gear configuration 69 is greater than the pitch circle radius of the gear configuration 70, and a typical, but not exclusive, ratio of the pitch circle radii of the gear configurations 69 and 70 would be 3:1. Thus, the rotatably connected members 68 having arcuate gear tooth surfaces 69 and 70 of differential gear diameters can be considered lever arms where the force exerted by the piston rod 56, neglecting friction, is magnified three times and is then translated to an opposed intensified force acting on the housing 41. Thus, the booster effect allows great force to be exerted by a relatively compact unit.

While a preferred embodiment of the invention has been shown and described, various modifications, changes in size and shape of parts etc., will suggest themselves to those familiar with the art, and such changes are considered to be within the spirit and scope of the invention.

What is claimed is:

1. A mechanism for selectively frictionally coupling two relatively rotatable bodies of the type comprising two parallel friction plates connected to a first one of said bodies transverse to the axis of rotation of said first body, the second of said bodies carrying an expandible fluid actuated piston and cylinder means mounted between said friction plates for engagement of friction members carried by said piston and cylinder means with said friction plates upon expansion of said piston and cylinder means, said piston and cylinder means being mounted to float in a cylinder carrying member on said second body for applying equal force against both said friction plates upon expansion of said piston and cylinder means, wherein the improvement comprises said piston and cylinder means having gear means therein for mechanically intensifying said force against said friction plates upon expansion of said piston and cylinder means, said gear means comprising a pair of diametrically opposed members mounted to rotate within the cylinder of said piston and cylinder means, each of said members having gear teeth at opposite ends of the member for meshing with teeth formed on the piston and cylinder.

2. The mechanism of claim 1 wherein said first body comprises a rotatable drive shaft and said second body comprises a rotatable output shaft aligned with said drive shaft, whereby the mechanism operates as a clutch.

3. A force intensifying piston and cylinder assembly comprising:
a cylinder having one closed end and one open end;
a piston slidably fitted for generally axial movement within said cylinder, said piston having a first cylindrical portion, a second cylindrical portion and a piston rod portion, said first cylindrical portion being axially spaced from said second cylindrical portion, and internally disposed within said cylinder near the closed end thereof, said piston rod portion being axially disposed between said first and said second cylindrical portions;
means for moving said piston toward said open end of said cylinder; and
two diametrically opposed members each being rotatably secured by pin within said cylinder, each of said pins being diametrically radially disposed from the longitudinal axis of said assembly and transversely secured at their ends thereof to the inside wall of said cylinder, each of said members having a first arcuate surface and a second arcuate surface oppositely disposed from said first arcuate surface, said second arcuate surface being defined by a radius which is substantially smaller than the radius defining said first arcuate surface, said radii outwardly extending from said pin, said first arcuate surface cooperating with the axial surface of said piston rod portion of said piston and said second arcuate surface cooperating with the axial surface of said inside wall of said cylinder, for intensifying the force transmitted by said piston by an amount equal to the ratio of said radii and for moving said cylinder in an axial direction opposite to said piston.

4. A force intensifying piston and cylinder assembly as set forth in claim 3 wherein said means for moving said piston toward said open end of said cylinder comprises a rolling diaphragm having a flat central area secured to a radial surface of said first cylindrical portion of said piston, a convolution in rolling contact with the axial surface of said first cylindrical portion of said piston and with said inside wall of said cylinder, and a lip area of said diaphragm being secured in place by an annular member secured within said cylinder near the closed end thereof, said diaphragm and said cylinder defining an air chamber selectively supplied with air under pressure to actuate movement of said piston.

5. A force intensifying piston and cylinder assembly as set forth in either claim 3 or claim 4 wherein said arcuate surfaces of said diametrically opposed members have a gear tooth configuration thereon, said gear tooth configuration cooperatively engaging matching gear teeth disposed on respectively mutually adjacent surfaces of said axial surface of said piston rod portion of said piston rod and on said axial surface of said inside wall of said cylinder.

6. A force intensifying piston and cylinder assembly as set forth in claim 5 wherein there is a spring coaxially disposed around each of said pins, said spring being torsionally urged between said diametrically opposed member and said cylinder for retracting said piston when pneumatic pressure is reduced inside said cylinder.

* * * * *